(12) United States Patent
Pickett (10) Patent No.: US 8,746,521 B2
(45) Date of Patent: Jun. 10, 2014

(54) ACTIVITY EQUIPMENT CARRYING APPARATUS

(75) Inventor: Thomas C. Pickett, Atlantic Beach, FL (US)

(73) Assignee: Contract Technical Resources Corporation, Newport New, VA (US)

( * ) Notice: Subject to any disclaimer, the term of this patent is extended or adjusted under 35 U.S.C. 154(b) by 818 days.

(21) Appl. No.: 11/132,239

(22) Filed: May 19, 2005

(65) Prior Publication Data

US 2005/0258208 A1 Nov. 24, 2005

Related U.S. Application Data

(60) Provisional application No. 60/572,609, filed on May 20, 2004.

(51) Int. Cl.
B62J 7/04 (2006.01)

(52) U.S. Cl.
USPC .............................. 224/427; 224/448; 224/460

(58) Field of Classification Search
USPC ......... 224/427, 457, 458, 451, 450, 414, 420, 224/421, 425, 426, 440, 452, 558, 412, 419, 224/441, 448, 447; 211/181.1
See application file for complete search history.

(56) References Cited

U.S. PATENT DOCUMENTS

| | | | | |
|---|---|---|---|---|
| 469,715 A | * | 3/1892 | Perry | 224/444 |
| 597,318 A | * | 1/1898 | Jenks | 224/448 |
| 607,782 A | * | 7/1898 | Erwin | 224/453 |
| 611,905 A | * | 10/1898 | Harman | 224/434 |
| 628,294 A | * | 7/1899 | Alderman | 224/445 |
| 2,589,497 A | * | 3/1952 | Jette | 224/453 |
| 2,880,919 A | * | 4/1959 | Persons et al. | 224/456 |
| 3,603,549 A | * | 9/1971 | Brilando et al. | 248/229.14 |
| 3,827,613 A | * | 8/1974 | Meyer | 224/457 |
| 4,415,105 A | * | 11/1983 | Jackson | 224/447 |
| 4,790,460 A | | 12/1988 | Harper, Jr. | |
| 4,792,072 A | * | 12/1988 | Gibson | 224/457 |
| 4,957,227 A | * | 9/1990 | Trimble | 224/414 |
| 5,127,529 A | * | 7/1992 | Martinez et al. | 211/37 |
| 5,244,132 A | * | 9/1993 | Christen | 224/430 |
| 5,678,742 A | * | 10/1997 | Lindauer | 224/454 |
| 6,079,600 A | * | 6/2000 | Linker et al. | 224/274 |

\* cited by examiner

Primary Examiner — Nathan J. Newhouse
Assistant Examiner — Corey Skurdal
(74) Attorney, Agent, or Firm — Breiner & Breiner, L.L.C.

(57) ABSTRACT

A carrying apparatus for transporting sports or activity equipment, such as a skateboard, in-line skates, a surfboard and/or the like, which attaches to a bicycle is disclosed. The carrying apparatus has a generally Y-shaped holding member and an adapter. The holding member holds a skateboard, in-line skates and/or a surfboard, while the adapter secures the carrying apparatus to a bicycle. The holding member preferably has a first extension member which extends into a first prong and a second extension member which extends into a second prong. The prongs connect at an adjoining central point. The adapter preferably has a first side portion and a second side portion, each of which may have a generally C-shaped portion. An inner wall of the first side portion and the second side portion fit around a seat support bar of a bicycle. The adapter may be secured to the seat support bar by any suitable means.

16 Claims, 11 Drawing Sheets

ACTIVITY EQUIPMENT CARRYING APPARATUS

RELATED APPLICATIONS

This application hereby claims the benefit under 35 U.S.C. §119(e) of U.S. Provisional Application Ser. No. 60/572,609, filed May 20, 2004 entitled ACTIVITY EQUIPMENT CARRYING APPARATUS.

FIELD OF INVENTION

The present invention is directed to an apparatus for carrying sports equipment or activity equipment, such as a skateboard, in-line skates, a surfboard and/or the like. More particularly, the present invention is directed to an apparatus for carrying sports equipment or activity equipment, such as a skateboard, in-line skates, surfboard and/or the like, which may be attached to a bicycle.

BACKGROUND OF INVENTION

Many people, adults and children alike, enjoy outdoor activities such as bicycling, skateboarding, in-line skating, mountain biking and surfing. Many people also enjoy doing a combination of these activities in the same day. However, it is often difficult to transport the equipment, especially for a combination of these activities.

For example, many people will ride their bicycle to a beach, a park, a skateboard park or a preferred area to ride their skateboard or to in-line skate. Carrying a skateboard, in-line skates (hereafter "skates") and/or a surfboard while riding a bicycle tends to be challenging or even difficult since the person needs his hands to control the bicycle and cannot hold the skateboard, skates and/or surfboard with his hands. As such, devices have been developed to aid the person in carrying his skateboard, skates and/or surfboard while riding his bicycle so that the person's hands are free to control the bicycle. Many of these devices are made to fit onto or around the rider, such as in the form of a backpack or an over-the-shoulder bag, see, e.g., U.S. Pat. No. 4,790,460. However, it may be cumbersome and awkward for the person while riding the bicycle to carry a skateboard, skates and/or a surfboard using these devices. Additionally, these types of devices place the weight of the skateboard, skates and/or surfboard onto the person's back and shoulders.

As such, a need exists for a carrying apparatus which allows a person to carry sports equipment or activity equipment, such as a skateboard, skates, surfboard and/or the like while riding a bicycle, but which is not actually held by or supported by the person. Accordingly, the present invention addresses these and other needs by allowing a person to carry sports equipment or activity equipment, such as a skateboard, skates, surfboard and/or the like, while riding a bicycle without having the person bear the weight of this equipment. This also provides a means for safely carrying such equipment.

OBJECTS AND SUMMARY OF THE INVENTION

The present invention is directed to an apparatus for carrying sports equipment or activity equipment, such as a skateboard, skates, surfboard and/or the like. More particularly, the present invention is directed to an apparatus for carrying sports equipment or activity equipment, such as a skateboard, skates and/or surfboard, which may be attached to a bicycle.

The carrying apparatus of the invention preferably comprises a holding member and an adapter. The holding member is used to hold the sports equipment or activity equipment, such as a skateboard, skates and/or surfboard, while the adapter secures the carrying apparatus to a bicycle.

In a preferred embodiment, the holding member is generally Y-shaped and comprises extension members and prongs. Specifically, a first extension member extends into a first prong and a second extension member extends into a second prong. The first prong is preferably connected to the second prong at an adjoining central point. In a preferred embodiment, an arm, which may be substantially horizontal in relation to the adapter, extends from the lower portion of each extension member. The arms preferably secure the holding member to the adapter.

The adapter may be any suitable means for attaching or securing the carrying apparatus to a bicycle. The adapter is preferably secured to the seat support bar of the bicycle. In a preferred embodiment, the adapter comprises a first side and a second side, wherein at least a portion of each side may be C-shaped. A portion of the inner wall of the first side and a portion of the inner wall of the second side of the adapter fit around the seat support bar of the bicycle and are secured to the seat support bar of the bicycle by any suitable means including, but not limited to, clamps, screws, bolts, welds, or adhesives.

A primary object of the present invention is to provide an apparatus for carrying sports equipment or activity equipment, such as a skateboard, skates, surfboard and/or the like, while a person is riding a bicycle, without the person having to carry the equipment or bear the weight of the equipment.

Another primary object of the present invention is to provide a sports equipment or activity equipment carrying apparatus, such as a skateboard, skates and/or surfboard carrying apparatus, which is secured to a bicycle.

Another object of the present invention is to provide an easy, convenient and safe means of carrying sports equipment or activity equipment, such as a skateboard, skates, surfboard and/or the like, while a person is riding a bicycle so that the person's hands are free to control the bicycle.

These primary and other objects of the invention will be apparent from the following description of the preferred embodiments of the invention and from the accompanying drawings.

BRIEF DESCRIPTION OF THE DRAWINGS

Referring now to the drawings.

DETAILED DESCRIPTION OF THE PREFERRED EMBODIMENTS

The present invention is a carrying apparatus 20 for carrying sports equipment or activity equipment, such as a skateboard, skates, surfboard and/or the like, which may be attached to a bicycle.

Referring to FIGS. 1-31, the carrying apparatus 20 of the invention preferably comprises a holding member 22 and an adapter 24,24',24". The holding member 22 holds the sports equipment or activity equipment, such as a skateboard, skates and/or surfboard, while the adapter 24,24',24" secures the carrying apparatus 20 to a bicycle.

In a preferred embodiment, as shown for example in FIGS. 1(a), 2, 11, 13, and 27, the holding member 22 is generally Y-shaped and comprises extension members 26,28 and prongs 30,32. Specifically, a first extension member 26 extends into a first prong 30 and a second extension member 28 extends into a second prong 32. In a preferred embodiment, the first prong 30 and the second prong 32 are substantially parallel. Each prong 30,32 preferably has an outer portion 42,44, an inner portion 46,48 and a free end 34,36. In a preferred embodiment, each free end 34,36 is generally semi-circular in shape, as shown for example in FIGS. 2 and 4. However, the free ends 34,36 of the prongs 30,32 may be any suitable shape such as, but not limited to, square, triangular and the like.

The first prong 30 is preferably connected to the second prong 32 at an adjoining central point 35. The adjoining central point 35 extends from and attaches to the inner portion 46,48 of each prong 30,32 and is generally V-shaped, as shown for example in FIGS. 1(a), 2, 5, 11, 13 and 27. However, the adjoining central point 35 may be any suitable shape such as, but not limited to, semi-circular, square, triangular and the like. The adjoining central point 35 may be angled away from the plane of the extension members 26,28 and the prongs 30,32, as shown for example in FIG. 3. In a preferred embodiment, an arm 38,40, may extend from the lower portion of each extension member 26,28 and may be generally horizontal in relation to the adapter 24,24',24". The arms 38,40 secure the holding member 22 to the adapter 24,24',24". Specifically, the arms 38,40 of the holding member 22 attach to the adapter 24,24',24" as detailed hereafter.

The adapter may be any suitable means for attaching or securing the carrying apparatus 20 to a bicycle. The adapter preferably secures or attaches to a seat support bar 80 of the bicycle. In a preferred embodiment, an adapter 24 comprises a first side portion 50 and a second side portion 52, wherein at least a portion of each side portion 50,52 is preferably C-shaped. The inner wall 56 of the first side portion 50 and the inner wall 58 of the second side portion 52 of the adapter 24 fit around the seat support bar 80 of the bicycle and are secured to the seat support bar 80 of the bicycle by any suitable means including, but not limited to, clamps, screws, bolts, welds, or adhesives. In a preferred embodiment, the adapter 24 is secured to the seat support bar 80 of the bicycle by screws 54, such as allen screws, in the first side portion 50 and the second side portion 52 of the adapter 24.

Figure 1A:
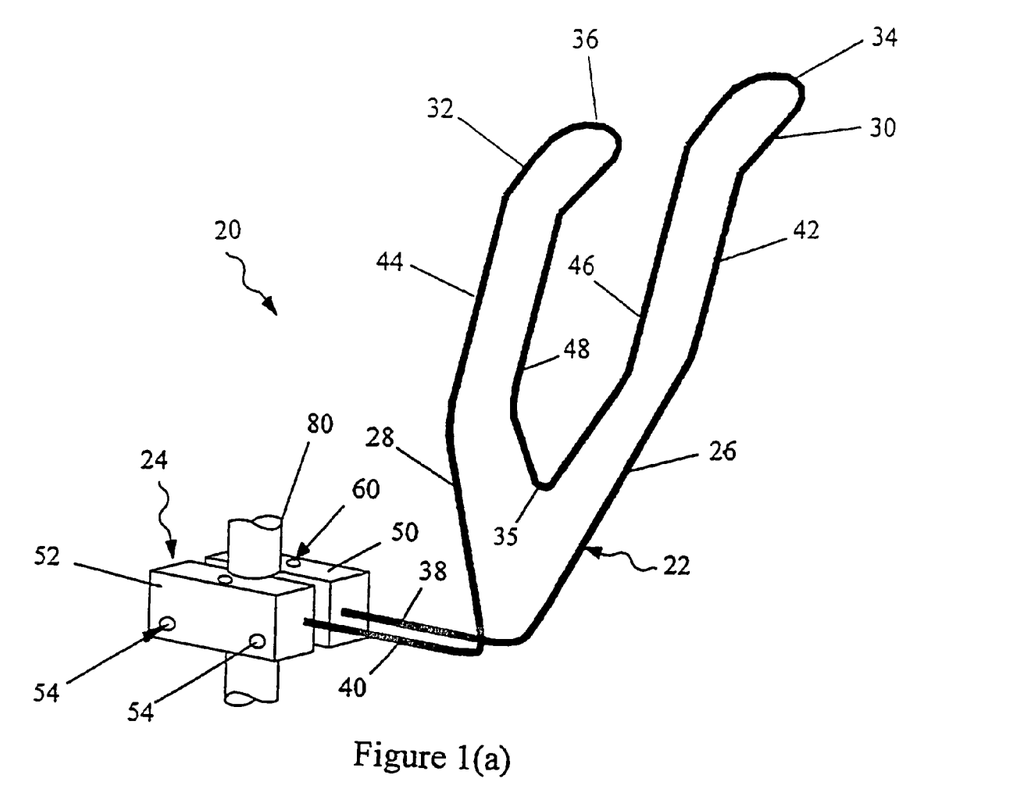
FIG. 1(a) is a perspective view of a first embodiment of the carrying apparatus of the present invention.

In a preferred embodiment, the arms 38,40 of the holding member 22 are secured to the adapter 24 by screws 60, such as allen screws, as shown for example in FIG. 1(a). Specifically, each arm 38,40 is preferably inserted into a channel opening 70, as shown for example in FIG. 10, in each respective side portion 50,52 of the adapter 24 and then secured in the channel by a screw 60, as shown for example in FIGS. 1(a) and 8. However, any suitable means may be used to secure the arms 38,40 of the holding member 22 to the adapter 24 such as, but not limited to, clamps, screws, bolts, welds, or adhesives.

Figures 11, 12:
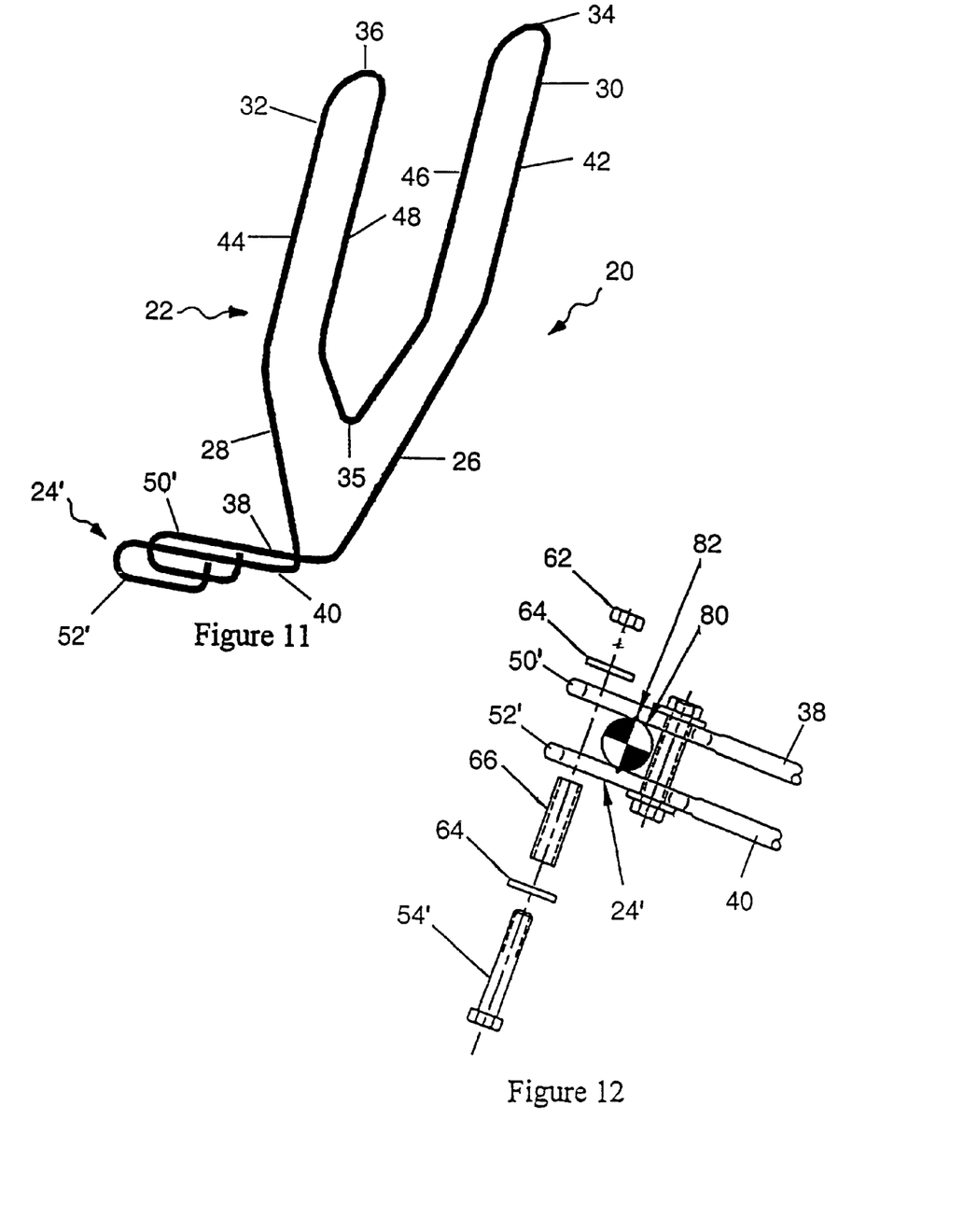
FIG. 11 is a perspective view of a third embodiment of the carrying apparatus of the present invention.
FIG. 12 is a partial exploded top view of an adapter of the carrying apparatus of FIG. 11 mounted to a seat support bar of a bicycle.
Figures 27, 28:
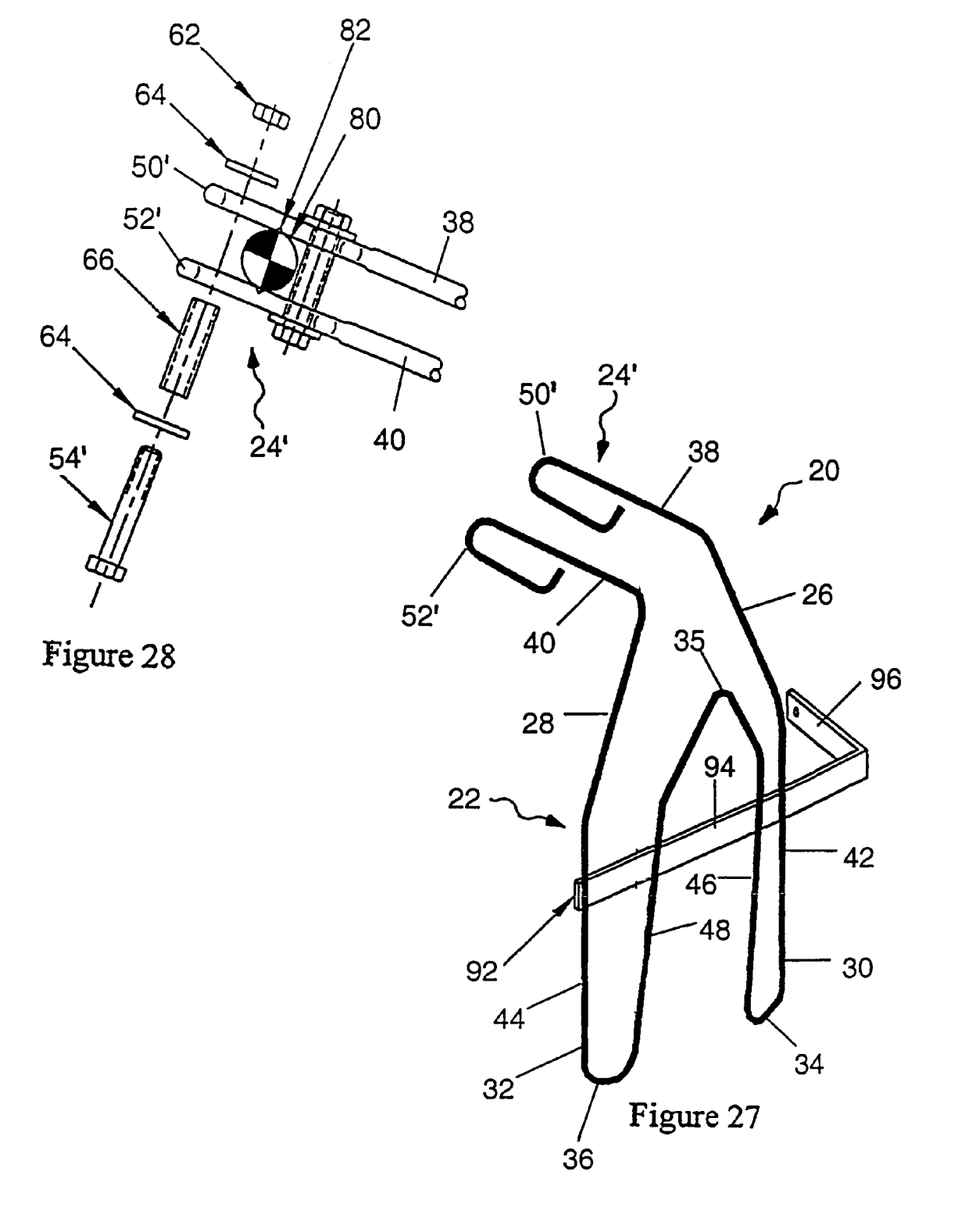
FIG. 27 is a perspective view of a fifth embodiment of the carrying apparatus of the present invention.
FIG. 28 is a partial exploded top view of an adapter of the carrying apparatus of FIG. 27.

In another preferred embodiment, an adapter 24' comprises a first side portion 50' and a second side portion 52', wherein each side portion 50',52' preferably has racetrack or loop rod endings, as shown for example in FIGS. 11 and 27. The first side portion 50' and the second side portion 52' of the adapter 24' fit adjacent the seat support bar 80 of the bicycle and are secured to or about the seat support bar 80 of the bicycle by any suitable means including, but not limited to, clamps, screws, bolts, welds, or adhesives. In a preferred embodiment, the adapter 24' is secured to the seat support bar 80 of the bicycle by a screw 54' and nut 62, as shown for example in FIGS. 12 and 28. Specifically, a first washer 64 may be placed on the screw 54', which may then be inserted into a sleeve 66 which fits into the opening formed in the loop rod endings of the adapter 24'. A second washer 64 may then be placed on the screw 54' and a nut 62 may be placed on the end of the screw 54' to secure the adapter 24' to the seat support bar 80 of the bicycle. Preferably, the washers 64 have a diameter larger than the opening formed in the loop rod endings in order to keep the screw 54' from passing through the openings in the loop rod endings, thereby securing the adapter 24' in place.

In another preferred embodiment, the adapter 24' may be secured to the seat support bar 80 of the bicycle by a toggle clamp.

Each loop rod ending may have a notch 82 in an inner side to provide the desired alignment of the adapter 24' around the seat support bar 80 and aid in securing the loop rod endings of the adapter around the seat support bar 80.

In another preferred embodiment, an adapter 24" comprises a first side portion 50" and a second side portion 52", wherein each side portion 50",52" has a first end 51, a substantially C-shaped center portion 53 and a second end 55. The C-shaped center portion 53 of the first side portion 50" and the C-shaped center portion 53 of the second side portion 52" of the adapter 24" fit around the seat support bar 80 of the bicycle. The adapter 24" is secured to the seat support bar 80 of the bicycle by any suitable means including, but not limited to, clamps, screws, bolts, welds or adhesives. In a preferred embodiment, the adapter 24" is secured to the seat support bar 80 of the bicycle by a screw 54" and nut 62, as shown for example in FIG. 14. Specifically, a first washer 64 may be placed on the screw 54", which may then be inserted into an opening in the first end 51 of the second side portion 52" and through an opening in the first end 51 of the first side portion 50". A second washer 64 may then be placed on the screw 54" and a nut 62 may be placed on the end of the screw 54" to secure the adapter 24" to the seat support bar 80 of the bicycle. A second screw 54" may then be secured through an opening in the second end 55 of each side portion 50",52" in a like manner.

Figures 13, 14:
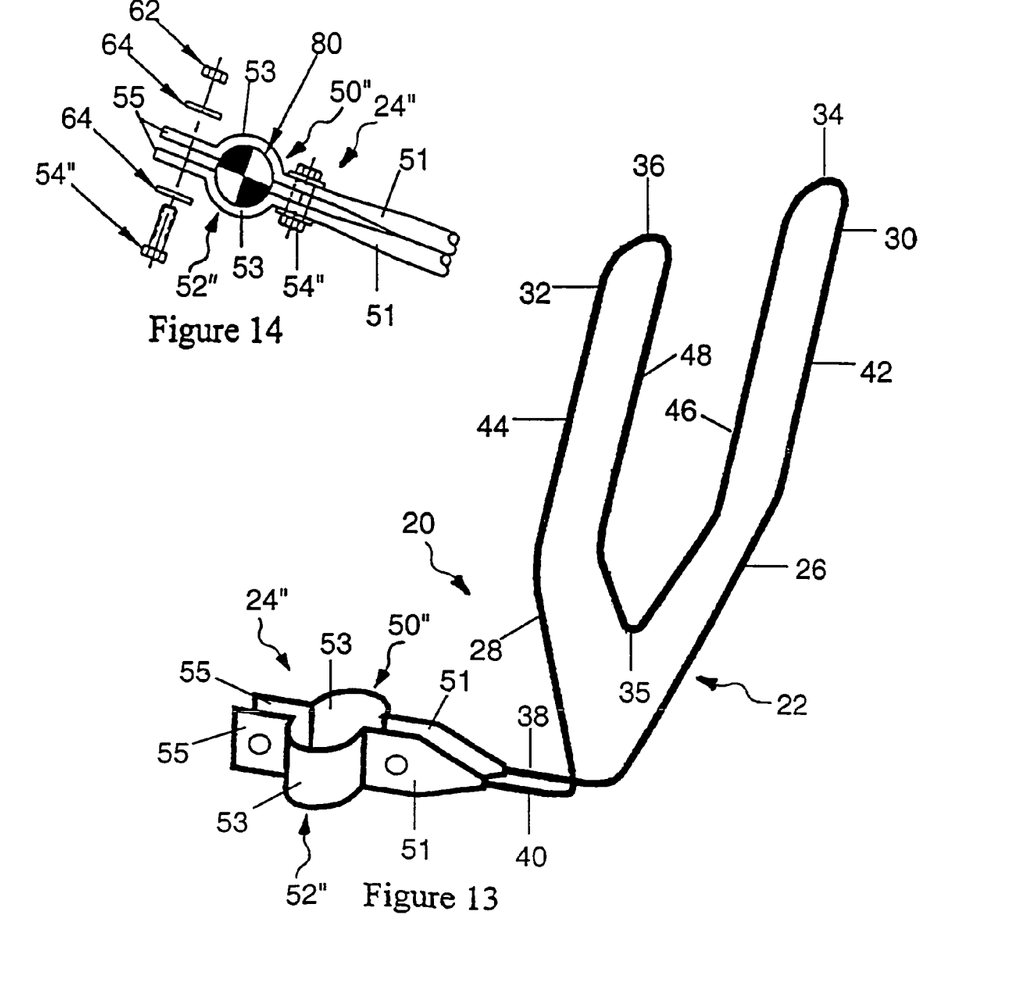
FIG. 13 is a perspective view of a fourth embodiment of the carrying apparatus of the present invention.
FIG. 14 is a partial exploded top view of an adapter of the carrying apparatus of FIG. 13 mounted to a seat support bar of a bicycle.
Figure 15:
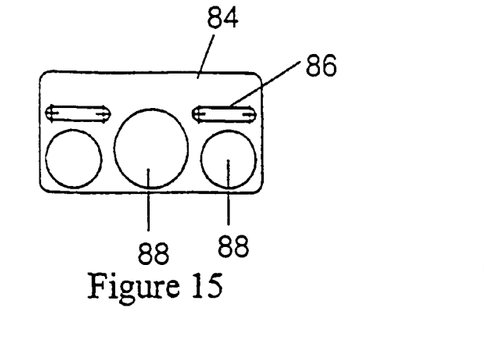
FIG. 15 is a top view of a first embodiment of a plate member.
Figure 16:
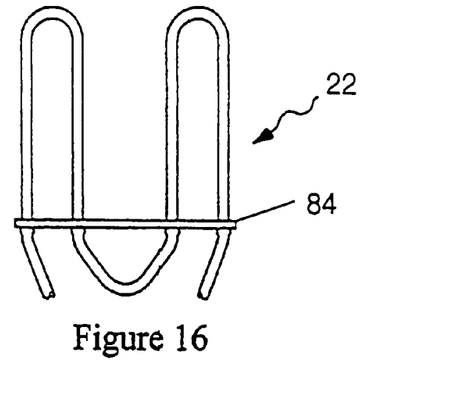
FIG. 16 is a partial back view of a holding member having the plate member of FIG. 15.
Figure 17:
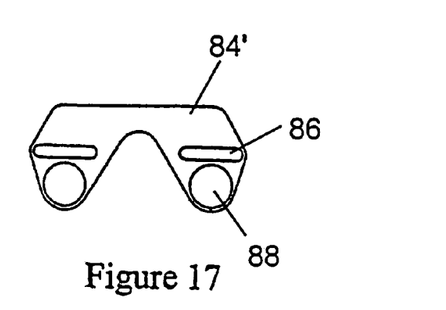
FIG. 17 is a top view of a second embodiment of a plate member.
Figure 18:
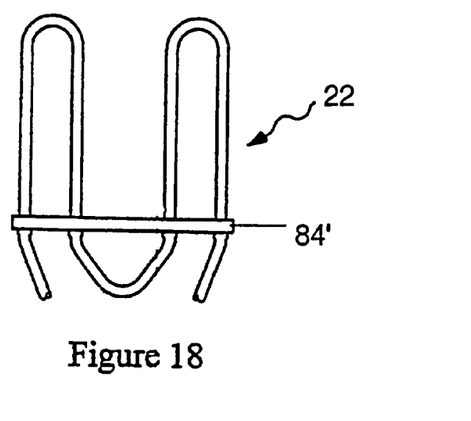
FIG. 18 is a partial back view of a holding member having the plate member of FIG. 17.
Figure 19:
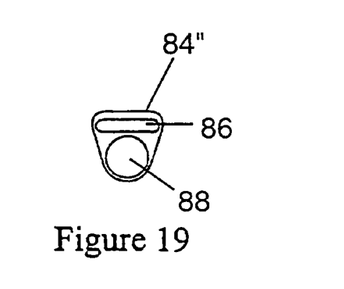
FIG. 19 is a top view of a third embodiment of a plate member.
Figure 20:
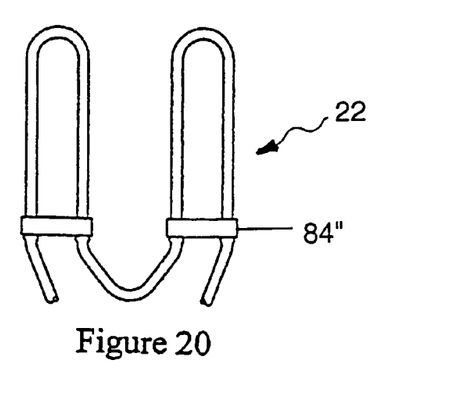
FIG. 20 is a partial back view of a holding member having the plate member of FIG. 19.
Figure 21:
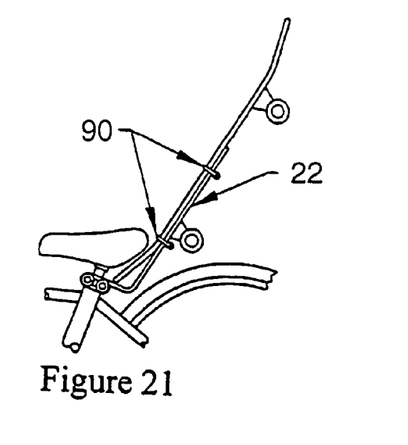
FIG. 21 is a side view of a carrying apparatus in an environment of use, e.g., carrying a skateboard.
Figure 22:
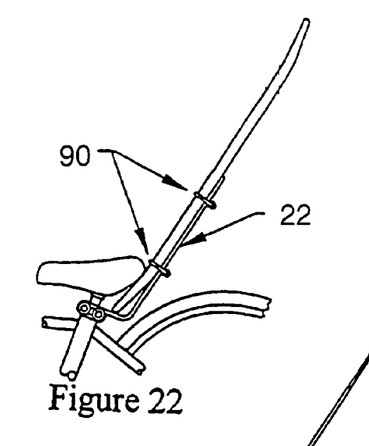
FIG. 22 is a side view of a carrying apparatus in an environment of use, e.g., carrying a surfboard or boogie board.
Figure 23:
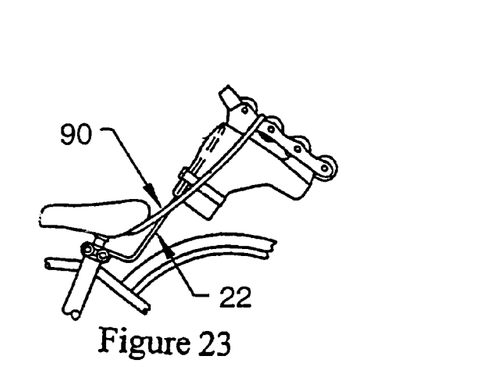
FIG. 23 is a side view of a carrying apparatus in an environment of use, e.g., carrying skates.

The washers preferably have a diameter larger than the openings in the side portions 50",52" in order to keep the screws 54" from passing through the openings in the first end 51 and second end 55 of the side portions 50",52", thereby securing the adapter 24" in place.

The carrying apparatus 20 may be made of any suitable material. The holding member 22 and the adapter 24,24',24" of the carrying apparatus 20 may be made from the same material or different material. In a preferred embodiment, the holding member 22 and the adapter 24,24',24" may be made of stainless steel, aluminum, any other suitable metal, a suitable plastic, any other suitable material or any combination thereof.

Figure 24:
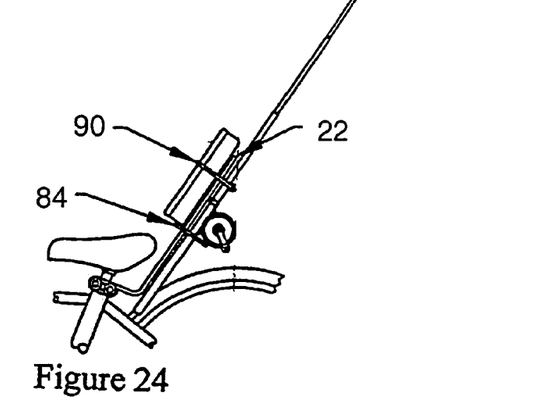
FIG. 24 is a side view of a carrying apparatus in an environment of use, e.g., carrying a fishing pole and tackle box.
Figure 25:
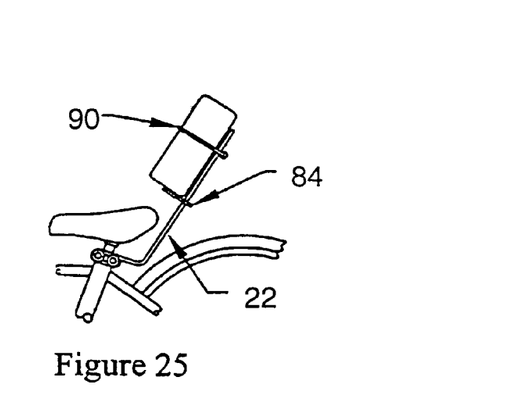
FIG. 25 is a side view of a carrying apparatus in an environment of use, e.g., carrying a back pack.
Figure 26:
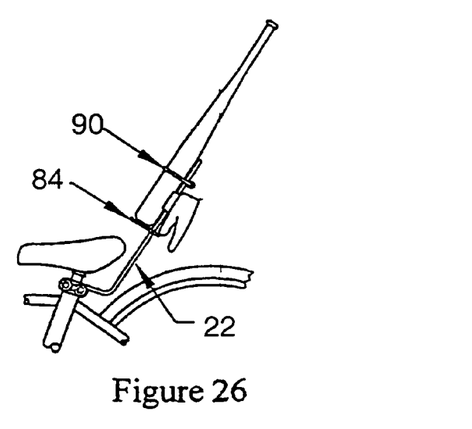
FIG. 26 is a side view of a carrying apparatus in an environment of use, e.g., carrying a baseball bat and glove.

The carrying apparatus 20 may also optionally comprise a brace plate 84,84',84" which fits over the holding member 22, as shown for example in FIGS. 15-20. The brace plate has at least one slot 86 which fits over the free end of the prongs of the holding member 22 and has at least one opening 88 therein. The brace plate may aid in holding sports equipment or activity equipment. For example, sports equipment or activity equipment may rest on the brace plate, as shown in FIGS. 24-26, or may be held within the opening 88. For example, a rod of a fishing pole may be positioned in the opening to hold the fishing pole in place on the carrying apparatus 20.

In order to use the carrying apparatus 20 of the present invention, the adapter 24,24',24" of the carrying apparatus 20 is secured to a seat support bar 80 of a bicycle in any suitable manner, such as detailed above. The carrying apparatus may be secured to the bicycle such that the prongs are directed upward off the back of the bicycle, such as shown for example in FIGS. 6 and 21-26 or directed downward off the side of the bicycle, such as shown for example in FIGS. 29 and 30. The carrying apparatus 20 may be orientated with the prongs directed upward off the back of the bicycle in order to carry items such as skateboards, skates, surfboards, back packs and/or the like. For example, in order to carry a skateboard, the skateboard is placed adjacent to the holding member 22, as shown for example in FIGS. 6, 7 and 21. A strap 90, such as a Velcro® strap, i.e., hook and loop, bungee cord or any other suitable means may be placed around the skateboard and holding member 22 to keep the skateboard secured to the carrying apparatus 20. In order to carry skates, such as shown for example in FIG. 23, the skates may be placed over and onto the prongs of the holding member 22 or may be secured to the carrying apparatus 20 in the same manner as a skateboard, as detailed above. Additionally, other sports equipment and activity equipment may be secured to the carrying apparatus 20 in a similar manner as detailed above.

Figure 29:
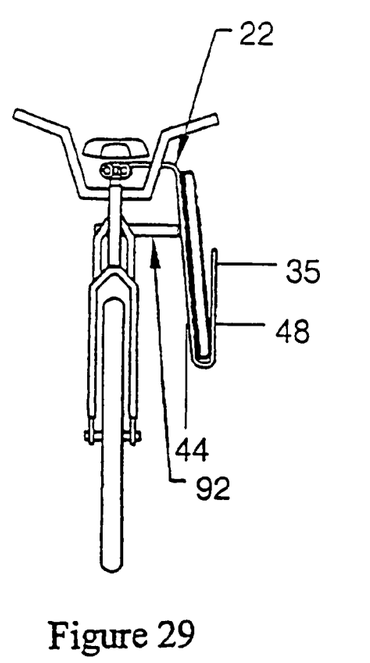
FIG. 29 is a side view of the carrying apparatus of FIG. 27 in an environment of use, e.g., carrying a surfboard.
Figure 30:
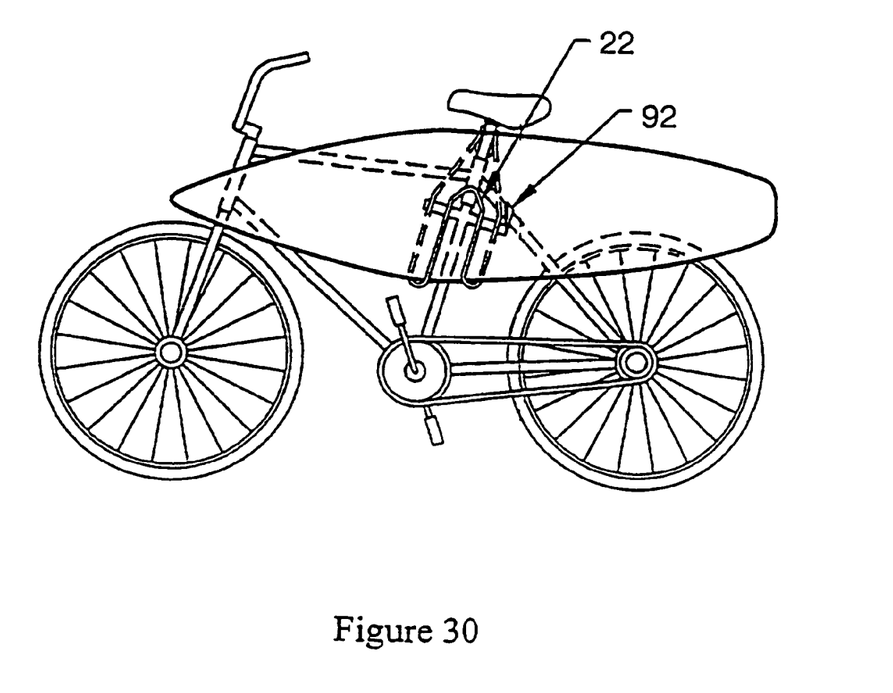
FIG. 30 is a front view of the carrying apparatus of FIG. 27 in an environment of use, e.g., carrying a surfboard.

The carrying apparatus 20 may be orientated with the prongs directed downward off the side of the bicycle, such as shown for example in FIGS. 27, 29 and 30, in order to carry items such as surfboards and/or the like. For example, in order to carry a surfboard, the surfboard is placed adjacent to the holding member, as shown for example in FIGS. 29 and 30. More particularly, the surfboard fits between the inner portion of the prongs and the outer portion of the prongs. Specifically, the inner portion of the prongs and the adjoining central point are on one side of the surfboard and the outer portion of the prongs are on the other side of the surfboard, thereby holding the surfboard in place on the holding member 22. A strap or any other suitable means may be placed around the surfboard and holding member 22 to aid in keeping the surfboard in place.

In this latter embodiment, the carrying apparatus 20 may optionally comprise a stiffening member 92. The stiffening member 92 is preferably an L-shape member wherein a first part 94 attaches to the outer portions of the prongs 30,32 and a second part 96 attaches to a back bar of the bicycle. The stiffening member 92 aids in keeping the carrying apparatus 20 secured to the bicycle.

Also in this embodiment, the prong of the carrying apparatus 20 operatively positioned nearer the rear of the bicycle may optionally be shorter in length than the prong operatively positioned nearer to the front of the bicycle to keep the surfboard or other equipment balanced on the carrying apparatus 20 when secured to the bicycle.

Figure 1B:
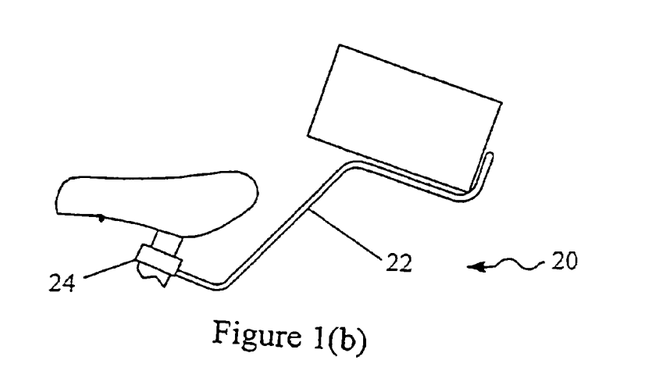
FIG. 1(b) is a side view of a second embodiment of the carrying apparatus of the present invention.
Figure 2:
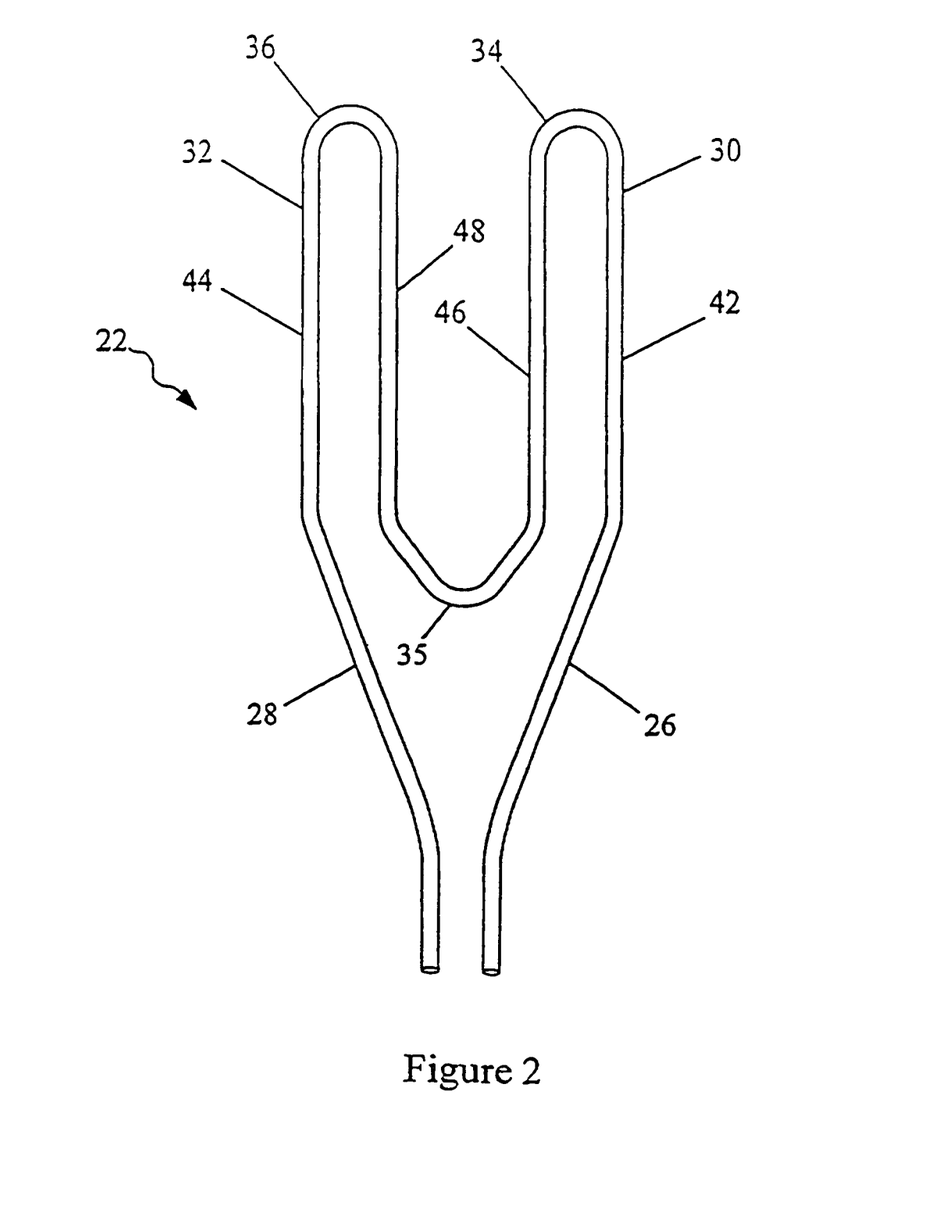
FIG. 2 is a front view of the holding member of the carrying apparatus of FIG. 1(a).
Figures 3, 4, 5:
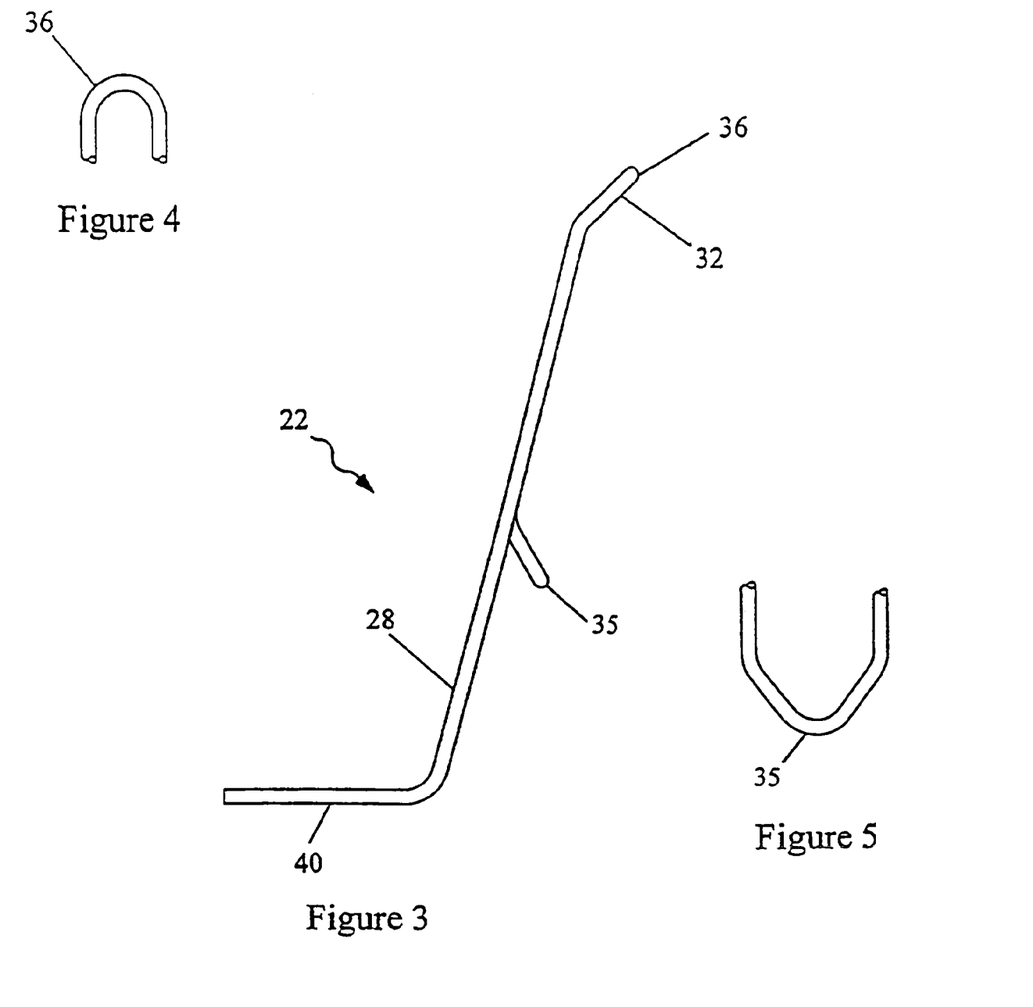
FIG. 3 is a side view of the holding member of the carrying apparatus of FIG. 1(a).
FIG. 4 is a front view of a free end of a prong of the holding member of the carrying apparatus of FIG. 1(a).
FIG. 5 is a front view of a lower central point portion of the holding member of the carrying apparatus of FIG. 1(a).
Figure 6:
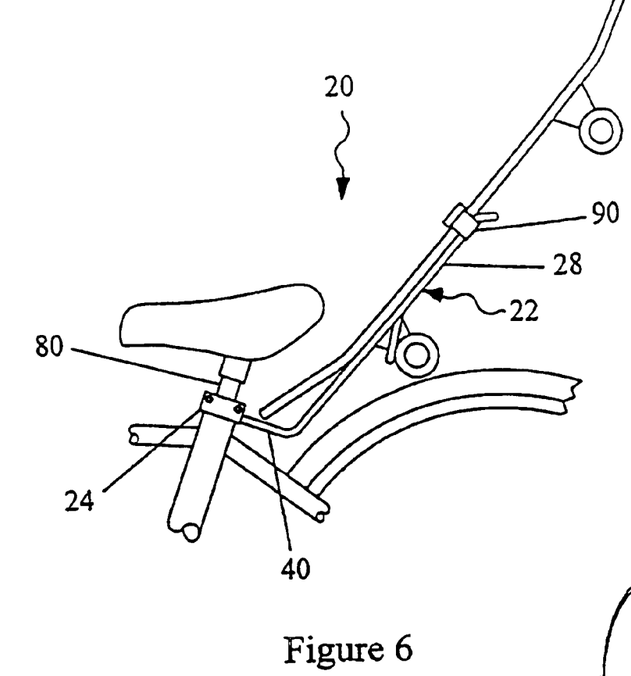
FIG. 6 is a side view of the carrying apparatus of FIG. 1(a) attached to a bicycle and carrying a skateboard.
Figure 7:
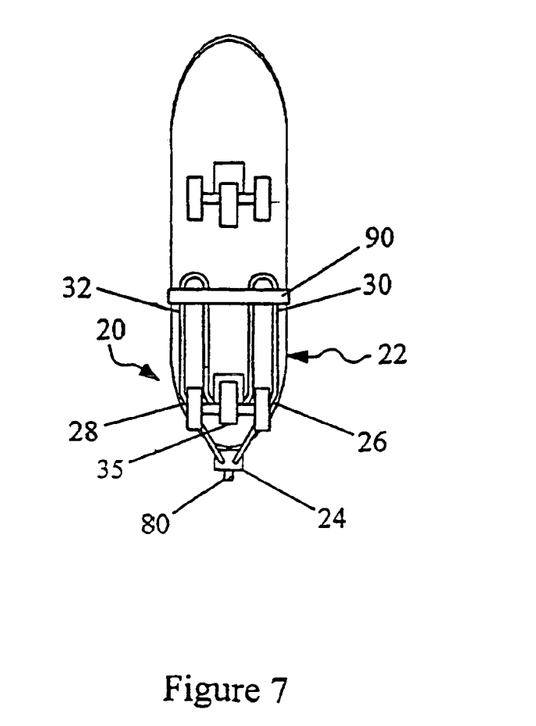
FIG. 7 is a back view of the carrying apparatus of FIG. 1(a) attached to a bicycle and carrying a skateboard.
Figure 8:
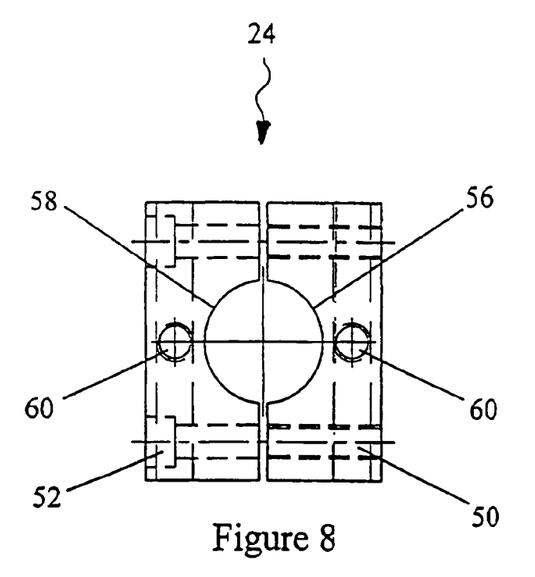
FIG. 8 is a top plan view of an adapter of the carrying apparatus of FIG. 1(a).
Figure 9:
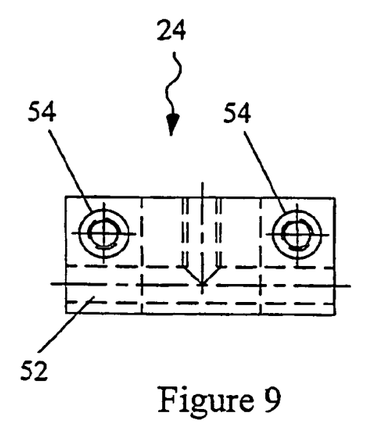
FIG. 9 is a side view of an adapter of the carrying apparatus of FIG. 1(a).
Figure 10:
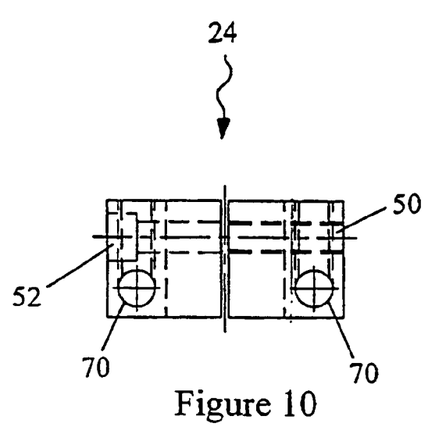
FIG. 10 is a back view of an adapter of the carrying apparatus of FIG. 1(a).
Figure 31:
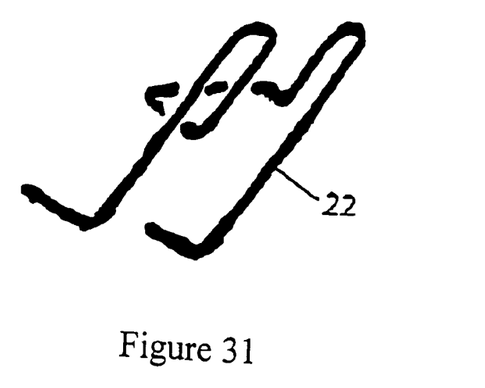
FIG. 31 is a perspective view of another embodiment of the holding member of the present invention.

FIG. 1(b) illustrates another preferred configuration of the present invention. FIG. 31 illustrates another preferred embodiment of the holding member of the present invention. While the preferred configurations of the carrying apparatus 20 has been detailed above, the carrying apparatus 20 may be any suitable configuration.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A sports or activity equipment carrying apparatus for attachment to a bicycle seat support bar comprising:
   an adapter being in a first plane wherein said first plane of said adapter is substantially perpendicular to an axis of the seat support bar of the bicycle when operatively positioned thereon;

at least one arm extending outwardly from said adapter and in the same plane as said adapter, and a holding member extending from said at least one arm, said holding member being substantially Y-shaped and entirely in a second plane substantially different than said first plane of said adapter and said second plane being substantially vertical to said adapter, said holding member is constructed and arranged to hold and carry a sports or activity equipment in said second plane, wherein said holding member is non-hinged, is non-pivotally affixed to said adapter and is not connected to an axle of said bicycle, and said adapter secures said carrying apparatus to said seat support bar of said bicycle.

2. The carrying apparatus of claim 1, wherein said holding member comprises:
   a first extension member;
   a second extension member;
   a first prong extending from a first end of said first extension member;
   a second prong extending from a first end of said second extension member; and
   a central point adjoining said first prong and said second prong.

3. The carrying apparatus of claim 2, wherein said first prong and said second prong are substantially parallel.

4. The carrying apparatus of claim 2, wherein said first prong and said second prong each have an outer portion, an inner portion and a free end.

5. The carrying apparatus of claim 1, wherein said adapter comprises:
   a first side portion;
   a second side portion; and
   at least one connecting means,
   wherein said first side portion and said second side portion are adapted to fit around said seat support bar of said bicycle.

6. The carrying apparatus of claim 5, wherein said first side portion and said second side portion each have a substantially C-shaped portion.

7. The carrying apparatus of claim 5, wherein said first side portion and said second side portion each have a loop rod ending.

8. The carrying apparatus of claim 2, further comprising a stiffening member attached to said first prong and said second prong, wherein said stiffening member is adapted to affix to a back bar of a bicycle to provide support to said carrying apparatus.

9. The carrying apparatus of claim 2, wherein said carrying apparatus is adapted to affix to a bicycle such that said first prong and said second prong of said holding member are directed upward off a back of said bicycle.

10. The carrying apparatus of claim 2, wherein said carrying apparatus is adapted to affix to a bicycle such that said first prong and said second prong of said holding member are directed downward off a side of said bicycle.

11. The carrying apparatus of claim 1, wherein said carrying apparatus is adapted to hold at least one sports equipment or activity equipment including at least one skateboard, in-line skates, surfboard, fishing pole, baseball bat or back pack.

12. The carrying apparatus of claim 1, wherein said carrying apparatus is made of stainless steel, aluminum, a metal, a plastic or a combination thereof.

13. The carrying apparatus of claim 1, further comprising at least one strap, wherein said at least one strap aids in securing at least one sports equipment or activity equipment to said carrying apparatus.

14. A sports or activity equipment carrying apparatus for attachment to a bicycle seat support bar comprising:
   an adapter being in a first plane wherein said first plane of said adapter is substantially perpendicular to an axis of the seat support bar of the bicycle when operatively positioned thereon and said adapter;
   at least one arm extending outwardly from said adapter and in the same plane as said adapter, and
   a substantially Y-shaped holding member extending from said at least one arm, said substantially Y-shaped holding member being entirely in a second plane substantially different than said first plane of said adapter and said second plane being substantially vertical to said adapter, said substantially Y-shaped holding member is constructed and arranged to hold and carry a sports or activity equipment in said second plane,
   wherein said holding member is non-hinged, is non-pivotally affixed to said adapter and is not connected to an axle of said bicycle, and said adapter is adapted to fit around said seat support bar of said bicycle.

15. The carrying apparatus of claim 14, wherein said substantially Y-shaped holding member comprises:
   a first extension member;
   a second extension member;
   a first prong extending from a first end of said first extension member;
   a second prong extending from a first end of said second extension member; and
   a central point adjoining said first prong and said second prong,
   wherein said first prong and said second prong are substantially parallel.

16. A sports or activity equipment carrying apparatus comprising:
   an adapter; and
   a holding member extending from said adapter, said holding member being in a plane substantially different than said adapter and said plane being substantially vertical to said adapter, said holding member is constructed and arranged to hold and carry a sports or activity equipment in a plane substantially different than said adapter, wherein said adapter secures said carrying apparatus to a bicycle;
   said holding member comprising a first extension member, a second extension member, a first prong extending from a first end of said first extension member, a second prong extending from a first end of said second extension member, and a central point adjoining said first prong and said second prong, and
   wherein a brace plate attaches to at least one of said first prong and said second prong.

* * * * *